United States Patent
Viterna (10) Patent No.: US 7,612,462 B2
(45) Date of Patent: Nov. 3, 2009

(54) FLOATING WIND TURBINE SYSTEM

(76) Inventor: Larry A. Viterna, 9670 Maurer Dr., Olmsted Falls, OH (US) 44138

( * ) Notice: Subject to any disclaimer, the term of this patent is extended or adjusted under 35 U.S.C. 154(b) by 8 days.

(21) Appl. No.: 12/150,072

(22) Filed: Apr. 24, 2008

(65) Prior Publication Data

US 2009/0091136 A1    Apr. 9, 2009

Related U.S. Application Data

(60) Provisional application No. 60/978,155, filed on Oct. 8, 2007.

(51) Int. Cl.
*F03B 13/12* (2006.01)
(52) U.S. Cl. .............................. 290/53; 290/42; 290/44; 290/54; 290/55
(58) Field of Classification Search ................... 290/42, 290/44, 55
See application file for complete search history.

(56) References Cited

U.S. PATENT DOCUMENTS

| | | |
|---|---|---|
| 5,584,655 A | 12/1996 | Deering |
| 5,599,168 A | 2/1997 | Lund |
| 6,616,402 B2 | 9/2003 | Selsam et al. |
| 6,979,171 B2 | 12/2005 | Lauritsen |
| 6,979,175 B2 | 12/2005 | Drake |
| 7,075,189 B2 | 7/2006 | Heronemus et al. |
| 7,098,552 B2 * | 8/2006 | McCoin ........................ 290/44 |
| 7,112,010 B1 | 9/2006 | Geiger |
| 7,156,037 B2 | 1/2007 | Borgen |
| 7,156,586 B2 | 1/2007 | Nim |
| 7,204,673 B2 | 4/2007 | Wobben |

(Continued)

FOREIGN PATENT DOCUMENTS

JP    2007-002721 A    11/2007

OTHER PUBLICATIONS

C. P. Butterfield, et al.; *Overview of Offshore Wind Technology*; Conference Paper NREL/CP-500-42252; Oct. 2007.

(Continued)

*Primary Examiner*—Nicholas Ponomarenko
*Assistant Examiner*—Iraj A Mohandesi
(74) *Attorney, Agent, or Firm*—MacMillan, Sobanski & Todd, LLC (57) ABSTRACT

A floating wind turbine system with a tower structure that includes at least one stability arm extending therefrom and that is anchored to the sea floor with a rotatable position retention device that facilitates deep water installations. Variable buoyancy for the wind turbine system is provided by buoyancy chambers that are integral to the tower itself as well as the stability arm. Pumps are included for adjusting the buoyancy as an aid in system transport, installation, repair and removal. The wind turbine rotor is located downwind of the tower structure to allow the wind turbine to follow the wind direction without an active yaw drive system. The support tower and stability arm structure is designed to balance tension in the tether with buoyancy, gravity and wind forces in such a way that the top of the support tower leans downwind, providing a large clearance between the support tower and the rotor blade tips. This large clearance facilitates the use of articulated rotor hubs to reduced damaging structural dynamic loads. Major components of the turbine can be assembled at the shore and transported to an offshore installation site.

19 Claims, 8 Drawing Sheets

U.S. PATENT DOCUMENTS

| | | | |
|---|---|---|---|
| 7,218,012 B1 * | 5/2007 | Edenfeld | 290/44 |
| 7,258,710 B2 | 8/2007 | Caro et al. | |
| 7,293,960 B2 | 11/2007 | Yamamoto et al. | |
| 7,296,971 B2 | 11/2007 | Borgen | |
| 7,476,074 B2 | 1/2009 | Jakubowski et al. | |
| 7,573,140 B2 * | 8/2009 | Neishi | 257/780 |
| 2003/0168864 A1 | 9/2003 | Heronemus et al. | |
| 2004/0057828 A1 | 3/2004 | Bosche | |
| 2005/0175451 A1 | 8/2005 | Wobben | |
| 2005/0238489 A1 | 10/2005 | Lund | |
| 2006/0233635 A1 | 10/2006 | Selsam et al. | |
| 2007/0212209 A1 | 9/2007 | Borgen | |

OTHER PUBLICATIONS

P. D. Sclavounos; *MIT Designs Invisible Floating Wind Turbines*; Internet Article from PHYSICS.COM; Nov. 9, 2007.

*Wind Power That Floats*; Internet Article from Technology Review as published by MIT; Apr. 5, 2008.

\* cited by examiner

FLOATING WIND TURBINE SYSTEM

CROSS-REFERENCE TO RELATED APPLICATIONS

This application claims the benefit of U.S. Provisional Application No. 60/978,155, filed Oct. 8, 2007, the disclosure of which is incorporated herein by reference.

STATEMENT REGARDING FEDERALLY SPONSORED RESEARCH OR DEVELOPMENT

Not applicable. The inventor is a federal employee at the National Aeronautics and Space Administration (NASA); however, the invention was conceived and reduced to practice by the inventor outside the scope of his official duties. A memorandum from the NASA Intellectual Property Counsel dated Sep. 20, 2007 states that: "Pursuant to 37 Code of Regulations, Section 501.7, it is the determination of NASA that title to the captioned invention shall remain with the federal employee inventor, Larry A. Viterna. NASA makes no claim to any rights in that invention."

BACKGROUND OF THE INVENTION

This invention relates in general to wind turbine systems and in particular to a floating wind turbine system.

Wind turbine systems convert the energy in moving air into other useful forms of energy, usually electricity. Prior art wind turbine systems usually include a wind generator driven by rotor blades and rotatably mounted upon an upper end of a vertical support tower such that the rotor may be rotated relative to the tower as the wind direction changes such that the rotor blades are maintained perpendicular to the wind. Over the past twenty-five years, wind turbine systems have established themselves as reliable systems in widespread use throughout the world. The vast majority of these wind turbine systems have been installed on land with the lower ends of the support towers extending into the ground for stability.

In the past few years, some wind turbine systems have been installed in waters offshore of land to capture higher wind speeds as well as for other advantages. These offshore wind turbines use support towers and foundations that are similar to those on land. Such current offshore technology is limited to water depths of about 25 meters or less. Installation costs for these offshore sites are significantly higher than on land because of the increased effort required while working on and in the water.

Concepts for deeper water installations that are currently under development are mostly derived from configurations for offshore oil well rigs to include floating platforms. Accordingly, such concepts typically require large cranes for erection of the towers and turbines and are not optimal for wind turbines because of the large aerodynamic force in the direction of the wind as well as forces associated with dynamics from the angular momentum of the turbine blades. Furthermore, wind and wave forces cause coupled motions of the support tower and the rotor blades, resulting in greater structural dynamic loads, deflections and stresses upon the wind turbine system. Therefore, it would be desirable to provide an offshore wind turbine system that not only is adaptable to the wind and wave forces, but also is easily installed in deep water locations.

SUMMARY OF THE INVENTION

This invention relates to a floating wind turbine system.

The present invention contemplates a floating wind turbine system that includes a buoyant support tower having a submersible end and a longitudinal axis. The system also includes at least one buoyant stability arm extending from the support tower and having a longitudinal axis that defines an acute angle with the support tower longitudinal axis. A position retention device retains the support tower within a desired area. Additionally, the system further includes a wind generator mounted upon the support tower.

The invention also contemplates that at least one variable buoyancy chamber is provided in either the support tower or the stability arm. A pumping system is provided that is operable to add water to or remove water from the buoyancy chamber to stabilize the floating wind turbine system. The invention further contemplates that the position retention device may include a tether and anchor point.

The present invention also contemplates a method for placement of the system above that includes providing both a water borne vessel having a cradle to position and retain a floating wind turbine system upon the vessel and the floating wind turbine system as described above. The wind turbine system is placed on the cradle and the vessel is moved to an installation site. At the installation site the position retention device is placed in the water. The wind turbine system is then released from the cradle and position retention device is adjusted to retain the system in position. Finally, the buoyancy of the support tower and stability arms is adjusted to position and stabilize the system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Presently preferred embodiments of the invention are shown in the figures identified above and described in detail below. It is emphasized that the drawings and description included herein are preferred embodiments and are not intended to limit the invention or claims. Instead, the intention is intended to cover all modifications, equivalents, and alternatives in the character and scope of the invention. In describing the preferred embodiment of the invention, common or similar characteristics are indicated by identical reference numerals, or in the absence of a reference numeral, are evident based upon the drawings or description. The figures are not necessarily to scale and may be shown exaggerated in scale for purposes of clarity and conciseness. The subject matter referred to using the terms "present invention," "invention" and variations as used throughout this document are to mean one or more possible embodiments of the invention and are not intended to, and should not, limit any claims merely because of such reference.

Figure 1:
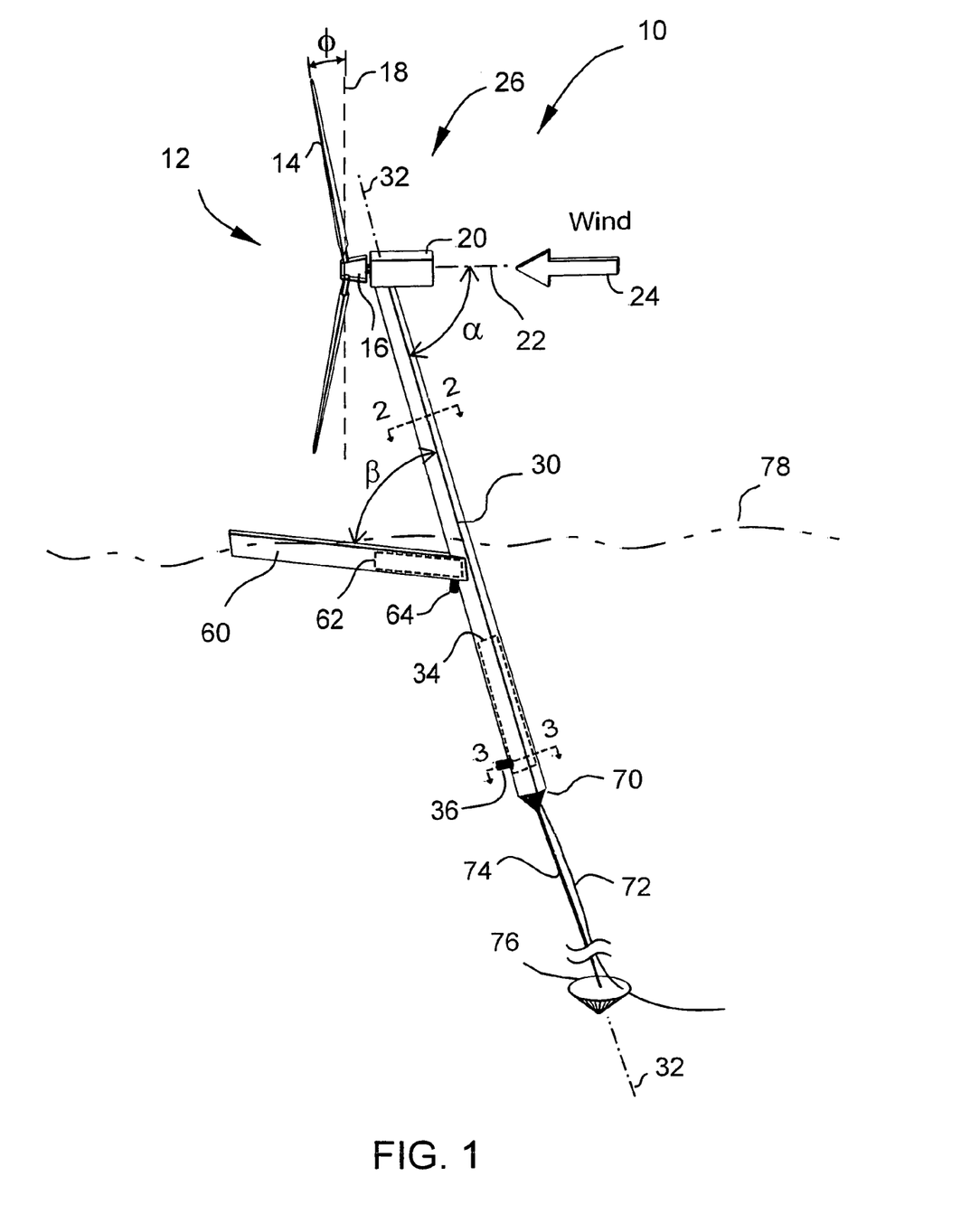
FIG. 1 is a perspective view of the embodiment of a floating wind turbine system that is in accordance with the present invention.

Referring now to the drawings, there is illustrated in FIG. 1, a wind turbine system 10 that is accordance with the present invention. The wind turbine system 10 includes a wind turbine rotor 12 having one or more blades 14 that are attached to a rotor hub 16. The rotor hub 16 is attached to a rotating low speed drive shaft (not shown) that is disposed within a nacelle 20, with the drive shaft defining an axis of rotation 22 for both the drive shaft and the rotor 12. A rotor plane of rotation shown as the dashed line labeled 18 is defined by a plane orthogonal to the axis of rotation 22 at the point where the blades 14 attach to the rotor hub 16. The blades 14 and rotor hub 16 may be preset to form a cone angle ϕ between the blades and a rotor plane of rotation. As shown in FIG. 1, the axis of rotation 22 of the drive shaft and rotor lies approximately in line with the wind direction, which is shown by the arrow numbered 24. The nacelle 20 contains drive train components such as, for example, the low speed drive shaft, a gearbox, an electric generator and miscellaneous mechanical and electrical equipment (not shown). The low speed drive shaft is connected in a conventional manner through the gear box to the electric generator. Thus, as the wind drives the rotation of the rotor 12, the rotation is transferred through the drive shaft and gearbox to rotate an armature within the electric generator, thereby generating electricity. The rotor blades 14, rotor hub 16, and nacelle components form a wind turbine generator 26. With regard to the nacelle 20, the rotor 12 is mounted upon the downwind end of the housing as opposed to a configuration where the rotor is mounted upon the upwind end of the housing (not shown).

Figure 2:
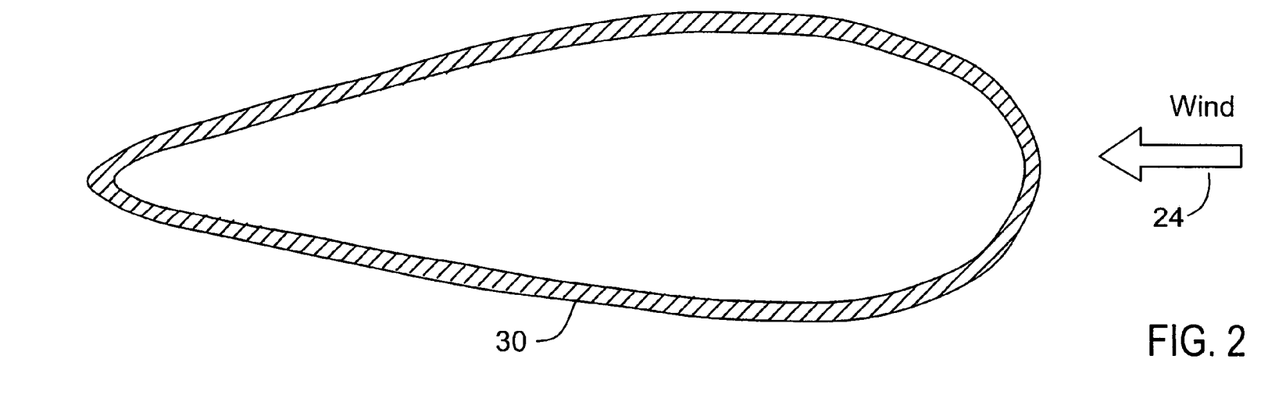
FIG. 2 is a sectional view of the support tower for the floating wind turbine system shown taken along line 2-2 in FIG. 1.
Figure 3:
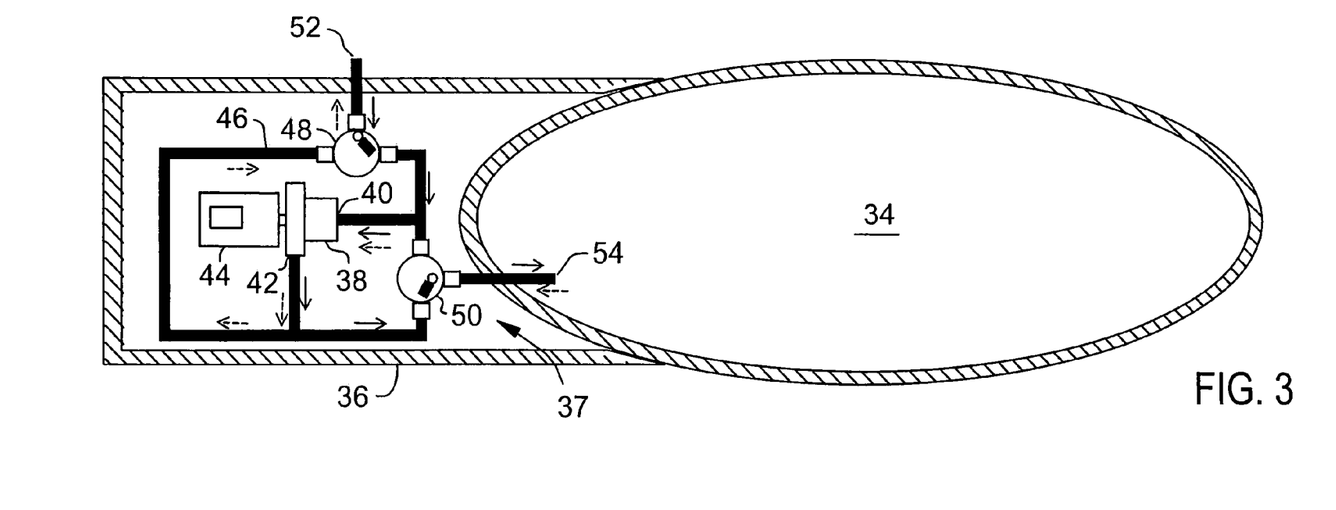
FIG. 3 is a sectional view of the support tower for the floating wind turbine system shown taken along line 3-3 in FIG. 1 that illustrates a buoyancy tank and pumping system.

The wind turbine generator 26 is mounted upon one end of a support tower 30 that is not submerged in the water and forms an acute angle of α that is defined between the drive shaft and rotor axis of rotation 22 and a longitudinal axis 32 of the support tower 30. As best seen in FIG. 2, the cross-sectional shape of the upper portion of the support tower 30 that extends above the surface of the water is similar to an airfoil in shape to reduce aerodynamic and hydrodynamic drag upon the tower while at the same time providing more strength in the direction of the wind loading. In the preferred embodiment, the lower portion of the support tower 30 that is below the surface of the water has an oval cross-sectional shape, as shown in FIG. 3. However, the invention also may be practiced with the same cross-sectional shape utilized for the entire length of the support tower.

The support tower 30 includes at least one buoyancy chamber 34, as best seen in the sectional view of FIG. 3 and shown in phantom in FIG. 1. The buoyancy chamber 34 may be either a separate buoyancy tank disposed within the support tower 30, as shown in FIG. 3, or may utilize the actual structure of the support tower by inserting transverse bulkheads (not shown) within the tower. A housing 36 that is attached to the support tower 30 carries a pumping system 37 that includes a pump 38 having an inlet port 40 and an outlet port 42. The pump 38 is driven by a motor 44 and is connected through piping 46 and first and second flow control valves 48 and 50 to a sea port 52 and a buoyancy chamber port 54, respectively. Not shown is a control unit that selectively activates the pump and controls the setting of the valves. While the pumping system 37 is illustrated as being in an external housing 36, it will be appreciated that the pumping system also may be disposed entirely within the support tower 30 (not shown).

For adding water to the buoyancy chamber 34, the flow control valves 48 and 50 are set as shown in FIG. 3. Accordingly, upon activating the pump 40, water flows from the sea port 52 through the first flow control valve 48 and into the inlet port 40 of the pump 38. The pump 38 forces the water through the outlet port 42 and to the second flow control valve 50 which directs the flow of water into the buoyancy chamber 34 via the buoyancy chamber port 54. The route of this intake water path is illustrated in FIG. 3 by the small solid arrows. To remove water from the buoyancy chamber 34, the flow control valves 48 and 50 are reversed (not shown) and the pump 38 is activated, drawing water from the buoyancy chamber 34 and through the second flow control valve 50 to the pump inlet port 40. The water is then forced from the pump outlet port 42, through the first flow control valve 48 and out the sea port 52 to reduce the amount of water contained in the buoyancy chamber 34. The route of this discharge water path is illustrated in FIG. 3 by the small dashed arrows. It is further contemplated that the flow control valves 48 and 50 have a third setting (not shown) which blocks the sea port 52 and buoyancy chamber port 54, respectively. The use of the flow control valves 48 and 50 avoids a need for a reversible pump and motor; however, it will appreciated that the pumping of water into and out of the buoyancy chamber 34 may also be accomplished by a system other than that shown in FIG. 3.

An integral buoyant stability arm 60 is attached to the support tower 30 and defines an acute angle β with the support tower longitudinal axis 32. As shown in FIG. 1, the stability arm 60 extends in the downwind direction from the support tower 30. The reason for this will be explained below. In the preferred embodiment, the acute angle β formed between the stability arm 60 and support tower longitudinal axis 32 is selected to be within a range of 10 to 89 degrees. Additionally, in the preferred embodiment, the acute angle β is less than the acute angle α that is defined between the drive shaft and rotor axis of rotation 22 and the longitudinal axis 32. However, it will be appreciated that the invention also may be practiced with the angle β being greater than or equal to the angle α. Additionally, while the stability arm 60 is illustrated as extending toward the upper end of the support tower 30 in FIG. 1, it will be appreciated that the invention also may be practiced with the stability arm extending toward the lower submerged end of the support tower or extending perpendicular from the support tower (not shown).

The stability arm also includes at least one buoyancy chamber 62 which may be filled and emptied by a pumping system that is similar to one described above and is contained in the housing 64. While the pumping system housing 64 is shown in FIG. 1 as being mounted directly upon the stability arm 60, the invention also contemplates attaching the housing within the stability arm 60 (not shown). It will also be appreciated that, while FIG. 1 shows a first buoyancy chamber 34 disposed within the support tower 30 and a second buoyancy chamber 62 disposed within the stability arm, 60, the invention also may be practiced with only one buoyancy chamber. If a single buoyancy chamber is utilized (not shown), it would be preferably disposed within the support tower 30; however, under certain conditions, it may be alternately disposed within the stability arm 60. Additionally, while two pumping systems 36 and 64 are shown in FIG. 1, the invention also may be practiced with the two buoyancy chambers 34 and 62 supplied by a single pumping system (not shown) with the addition of more valves to direct the flow of water between the two chambers.

A rotatable tether attachment 70 is mounted upon the lower end of the support tower 30 that is opposite from the wind turbine generator 26 and that is submerged. The tether attachment 70 includes a rotatable slip ring (not shown) for transferring the electrical power from the electric generator through a submersible electrical conductor 72 to a power load (not shown). The power load may be located either underwater or upon land. In the latter case, the submersible electrical conductor 72 extends from the wind turbine system across the sea floor to the shore and the load. A tether 74 extends from the tether attachment 70 to an anchor point 76 that is located below the sea surface 78 upon the sea floor. The anchor point 76 and tether 74 co-operate with the tether attachment 70 to maintain the wind turbine system 10 in position upon the sea surface 78. While the preferred embodiment of the invention utilizes a tether and anchor point, it will be appreciated that the invention also may be practiced with other position retention devices attached to the support tower that are operable to retain the support tower within a desired area. Such position retention devices would also allow the support tower to move in response to at changing wind conditions and/or changing wave conditions. For example, the submerged end of the support tower may be mounted upon the upper end of a submerged piling that is set in the sea bed with a pivoting and rotating connector (not shown).

The wind turbine system 10 is designed to respond to changes in the wind speed and direction by movement through the water and rotation upon the surface of the water. The system configuration of a downwind rotor with a large distance to the pivot point at the anchoring site on the sea floor allows the wind turbine to follow the wind direction without an active yaw drive system. This eliminates the need for an active drive system and associated components that are typically included in prior art wind turbine systems to maintain alignment of the drive shaft and rotor axis with the wind direction. With the present invention, the entire wind turbine system 10 is free to pivot about the anchor point 76 as the wind direction changes. Thus, the wind pressure upon the rotor blades 14 and sides of the support tower 30 co-operate with the rotatable tether attachment 70 to pivot the system relative to the anchor point 76.

When the wind turbine system 10 is exposed to higher wind loading, the rotor blades 14 tend to deflect downwind. However, because the rotor blades 14 are mounted upon the downwind end of the nacelle 20 and because the mounting angle $\alpha$ causes the support tower 30 to recede away from the rotor blades, the risk of interference between the blades 14 and the support tower 30 is reduced. The pumps are used to add and subtract water to and from the buoyancy chambers 34 and 62 in the support tower 30 and the stability arm 60, respectively, to provide a variable buoyancy for the wind turbine system 10.

The specific lengths of the individual components, such as the portions of the support tower 30 that extend above and below the sea surface 78, the stability arm 60, the tether 74, and angles $\alpha$ and $\beta$ are dependent upon the specific weights of the components in the system as well as the expected forces generated by wind and water for the selected placement location. The inventor contemplates that engineering analysis and design studies will assure that the correct balance of all of the forces under any combination of wind and wave loads will prevent any sensitive components of the wind turbine generator 26 from being submerged or damaged.

Figure 4:
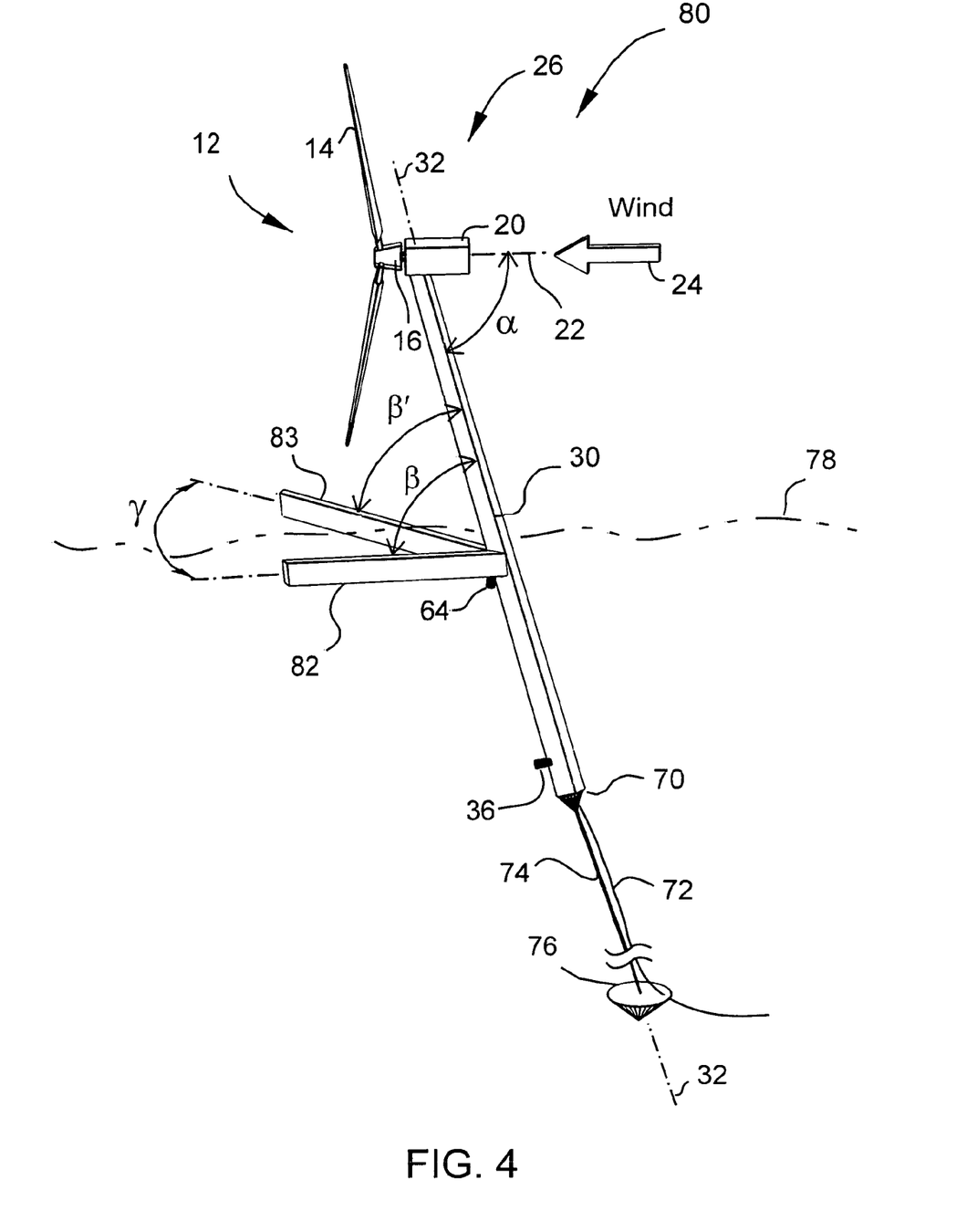
FIG. 4 is a perspective view of an alternate embodiment of the floating wind turbine system shown in FIG. 1 that includes two stability arms.

Referring to FIG. 4, there is shown another embodiment 80 of the floating wind turbine system that has a first stability arm 82 and a second stability arm 83. The two stability arms 82 and 83 define a stability arm angle $\gamma$ therebetween. In the preferred embodiment, the stability arm angle $\gamma$ is selected to be within a range of 30 to 150 degrees. Additionally, the first stability arm 82 defines a first acute angle $\beta$ with the support tower longitudinal axis 32, while the second stability arm 83 defines a second acute angle $\beta'$ with the support tower longitudinal axis 32. In the preferred embodiment, the first and second angles $\beta$ and $\beta'$ differ by a small amount, such as, for example five degrees, to offset torque effects of the rotor 12 upon the support tower 30. However, the invention also may be practiced with the first and second angles $\beta$ and $\beta'$ being equal. While two stability arms are shown in FIG. 4, it will be appreciated that the invention also may be practiced with more than two stability arms (not shown). In the preferred embodiment, at least one of the stability arms 82 and 83 would include at least one buoyancy chamber (not shown). Alternately, both of the stability arms 82 and 83 may include one or more buoyancy chambers. Additionally, as described above, neither of the stability arms 82 and 83 may include a buoyancy chamber. Inclusion of multiple stability arms provides additional side-to-side stability perpendicular to the blade rotational axis, that is, vertical system stability, during operation as well as when the wind turbine system is being transported in the water to the installation site.

Figure 5:
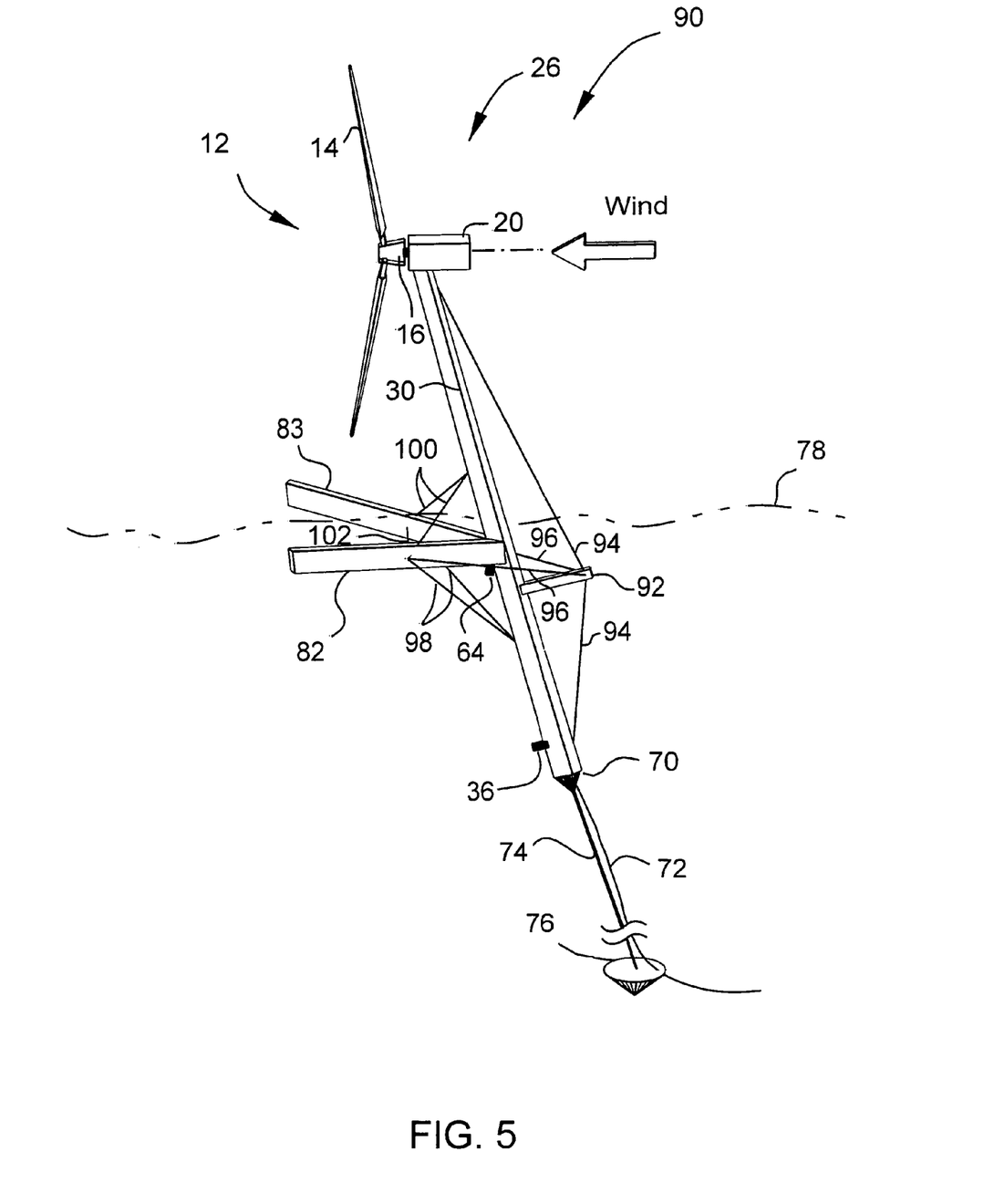
FIG. 5 is a perspective view of another alternate embodiment of the floating wind turbine system shown in FIG. 1 that includes a structural guy post and guy cables.

Another alternate embodiment 90 of the invention is shown in FIG. 5 and includes structural variations of the support tower 30 and the stability arms 60. Additional structural members include a guy post 92 having a first end attached to the support tower 30 and extending perpendicularly therefrom. A first guy cable 94 having ends secured near, or at, each end of the support tower 30 passes through the second end of the guy post 92. Additionally, a pair of second guy cables 96 extend from the second end of the guy post 92 to the outside surface of each of the stability arms 82 and 83. Two pairs of third guy cables 98 and 100 are attached between the stability arms 82 and 83 and lower and upper portions of the support tower 30, respectively. Finally, a fourth guy cable 102 extends between the inner surfaces of the stability arms 82 and 83. The guy cables shown in FIG. 5 distribute the force loads to which the support tower 30 and stability arms 82 and 83 are exposed. While four types of guy cables are shown in FIG. 5, it will be appreciated that the invention may be practiced with more or less guy cables. Additionally, while the guy post and guy cables were illustrated with a wind turbine system having two stability arms, they may also be added to systems having more or less stability arms, such as, for example the system 10 shown in FIG. 1 that has a single stability arm 60.

Figure 6:
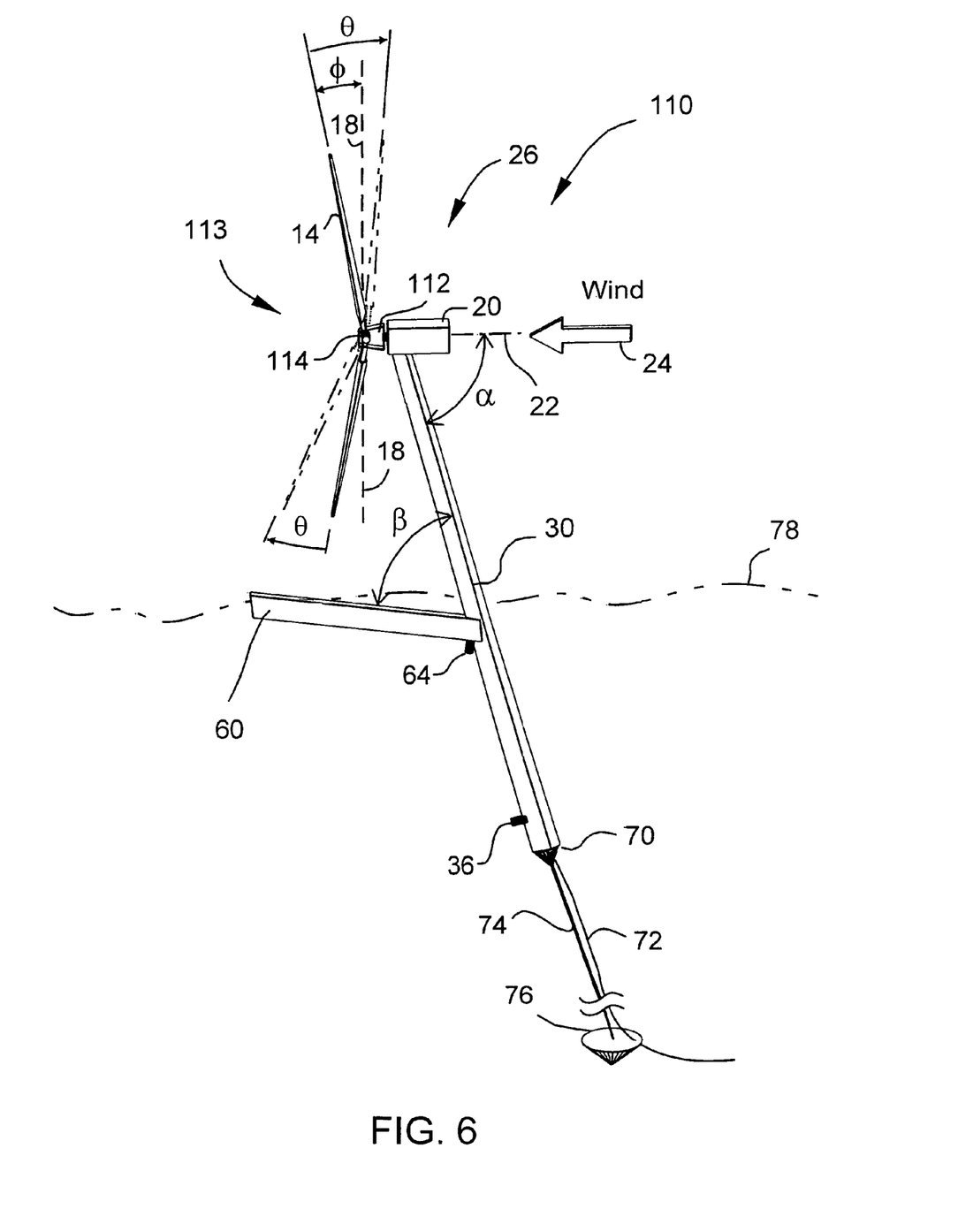
FIG. 6 is a perspective view of another alternate embodiment of the floating wind turbine system shown in FIG. 1 that includes a pivotable connection between the rotor blades and the rotor hub.

Floating wind turbines will be the first to experience significant movement of the support tower. Prior art wind turbine technology will experience large cyclic bending stresses in the blades because of their rigid hubs or articulated hubs with capability to pivot the blades only a few degrees. The large blade to tower clearance of the configuration of the present invention allows the use of articulation of the blades at the rotor hub. The articulation is provided by a pivot point between the blades and the drive shaft of the wind generator. The capability for large blade pivot angles reduces the coupled motions of the blades and the support tower induced by wind and waves. Referring now to FIG. 6, there is shown another alternate embodiment 110 of the wind turbine system that has a rotor hub 112 that includes articulation to allow for sufficient pivoting of the rotor blades 14 with respect to the plane of rotation 18. The rotor blade articulation reduces cyclic loads upon the supporting structure by decoupling the blade motions from that of the support tower 30. A conventional teetered rotor 113 is used for the rotor blades 14 by introducing a blade pivot 114 that allows the blades 14 to pivot at the hub 112 through a blade pivot angle θ. Wind shear and/or wind gusts may impose an unbalanced load upon the wind turbine system that may drive the tip of one rotor blade 14 downwind and the tip on the opposite rotor blade upwind. The use of pivot point at the hub 112 end of the rotor blades 14 and the geometric capability for large deflections θ will significantly reduce these unbalanced cyclic loads on the structure that can decrease the reliability of a wind turbine. Other forms of articulated hubs that may be utilized with the present invention include individually pivotable blades and flexible drive shafts within the nacelle 20. While the wind turbine system 110 shown in FIG. 6 includes a single stability arm 60, it will be appreciated that the invention also contemplates adding blade pivots to the alternate embodiments 80 and 90 described above.

Figure 7:
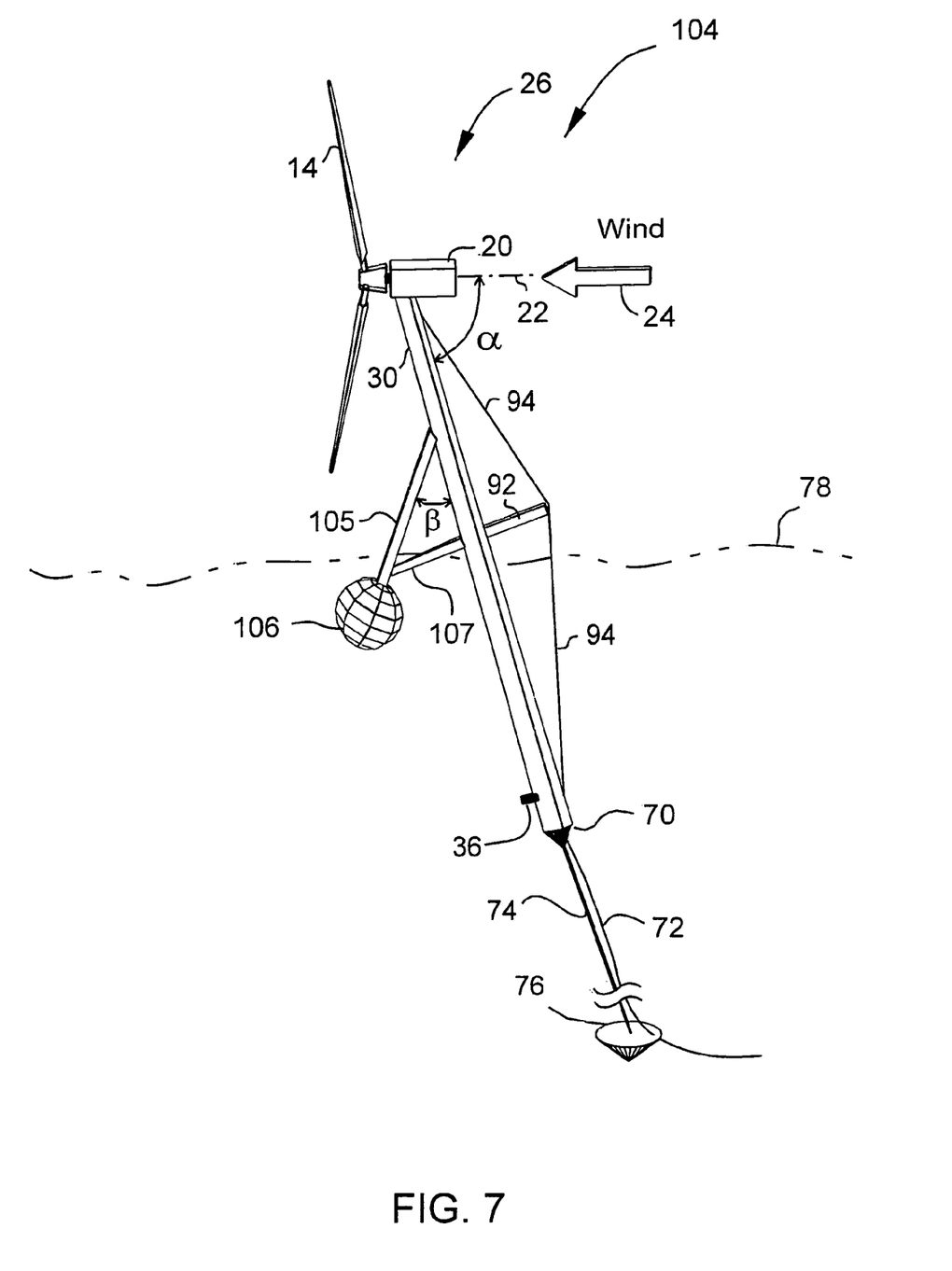
FIG. 7 is a perspective view of another alternate embodiment of the floating wind turbine system shown in FIG. 1 that includes an alternate stability arm structure.

Another alternate embodiment 104 of the invention that includes a structural variation of the stability arm is shown in FIG. 7. As described above, an acute angle β is formed between the support tower 30 and a single stability arm 105; however, the stability arm extends toward the submerged end of the support tower 30 and terminates in a buoyancy chamber 106. A support strut 107 is disposed between the support tower 30 and the stability arm 105 to maintain the stability arm in position relative to the support tower 30. While the buoyancy chamber 106 is shown as having a generally spherical shape, it will be appreciated that the invention also may be practiced with buoyancy chambers having different shapes (not shown). Additionally, while a single stability arm 105 is shown in FIG. 7, the invention also may be practiced with a plurality of stability arms (not shown). Furthermore, the invention contemplates that the buoyancy chamber 106 may be provided with a pumping system (not shown) for varying the buoyancy of the chamber.

In summary, buoyancy for the turbine systems described above is provided by a buoyant support tower 30 and at least one stability arm 60 extending off of the principal axis of the support tower 30. One or more buoyancy chambers 34 and 62 in the support tower 30 as well as in the stability arm 60 provide additional variable buoyancy. The stability arm 60 shifts the centers of buoyancy and mass off of the principle axis 32 of the support tower 30. The wind turbine 26 is configured with a downwind rotor 12 with the rotor blades 14 positioned downwind of the support tower structure. The support tower and stability arm structure is designed to balance tension in the tether with buoyancy, gravity and wind forces in such a way that the top of the support tower 30 leans downwind with the angle α providing a large clearance between the support tower and the rotor blade tips. As shown in the drawings, the non-vertical support tower 30 forms an acute angle with the surface 78 of the water that is approximately equal to the angle α formed between the support tower and the axis of rotation 22 of the wind turbine rotor 12. The supporting structure also is shaped to reduce the drag forces on the support tower 30 as the air and water moves around it. Additional system elements of a guy post and guy cables increase the structural strength of the structure.

The present invention contemplates that full or partial assembly of the wind turbine with the support tower in the near horizontal position can occur upon the shore. Alternately, a ship or barge may be used to support the components during assembly. During transportation to the offshore installation site, the wind turbine may float partially under its own buoyancy. The pumping system and associated buoyancy chambers for changing the buoyancy of the wind turbine tower structure facilitates erecting the wind turbine at the installation site as well as lowering the wind turbine for repair and removal.

Figure 8:
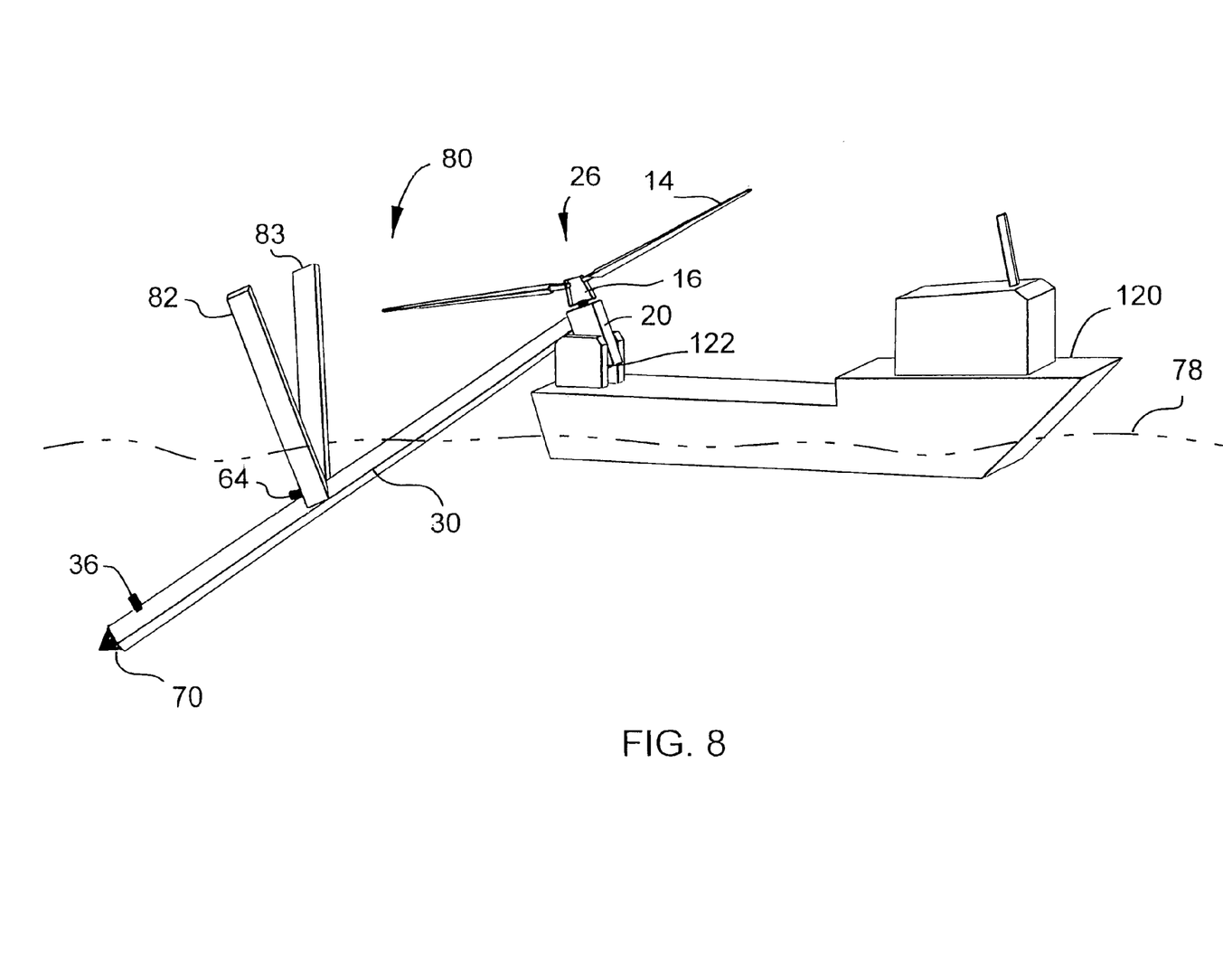
FIG. 8 is a perspective view of the embodiment of the floating wind turbine system shown in FIG. 4 being transported upon a ship.

As indicated above, the present invention also contemplates a method for transporting the wind turbine system to an offshore installation site with a ship or barge. Referring now to FIG. 8, there is shown a ship 120 that is equipped to move the floating wind turbine system 80 to a desired location on the surface 78 of the water. The ship 120 transports the major components of the wind turbine system 80, including the blades 14, the hub 16, the nacelle 20, the support tower 30, the stability arms 82 and 83, as well as the tether attachment 70 while allowing these components to be assembled together either on shore or at the shoreline of the water. The invention also contemplates utilizing a barge (not shown) in lieu of the ship 120 shown in FIG. 8 to transport the wind turbine system 80. Alternately, as described above, the components may be assembled upon the ship or barge that will be used to transport the wind turbine system to its designated location. The ship 120 includes a cradle 122 that supports the wind turbine generator 26 allowing the lower portion of the wind turbine system 80 to extend into the water. Thus, the method allows the wind turbine system 80 to be moved through the water while keeping water-sensitive components secure and above the sea surface 78. Alternatively, the wind turbine system 80 could be fully supported in a horizontal position aboard the ship or barge (not shown) for transport to the offshore installation site. With the alternate positioning of the wind turbine system upon the ship or barge, no portion of the system would be in the water.

Figure 9:
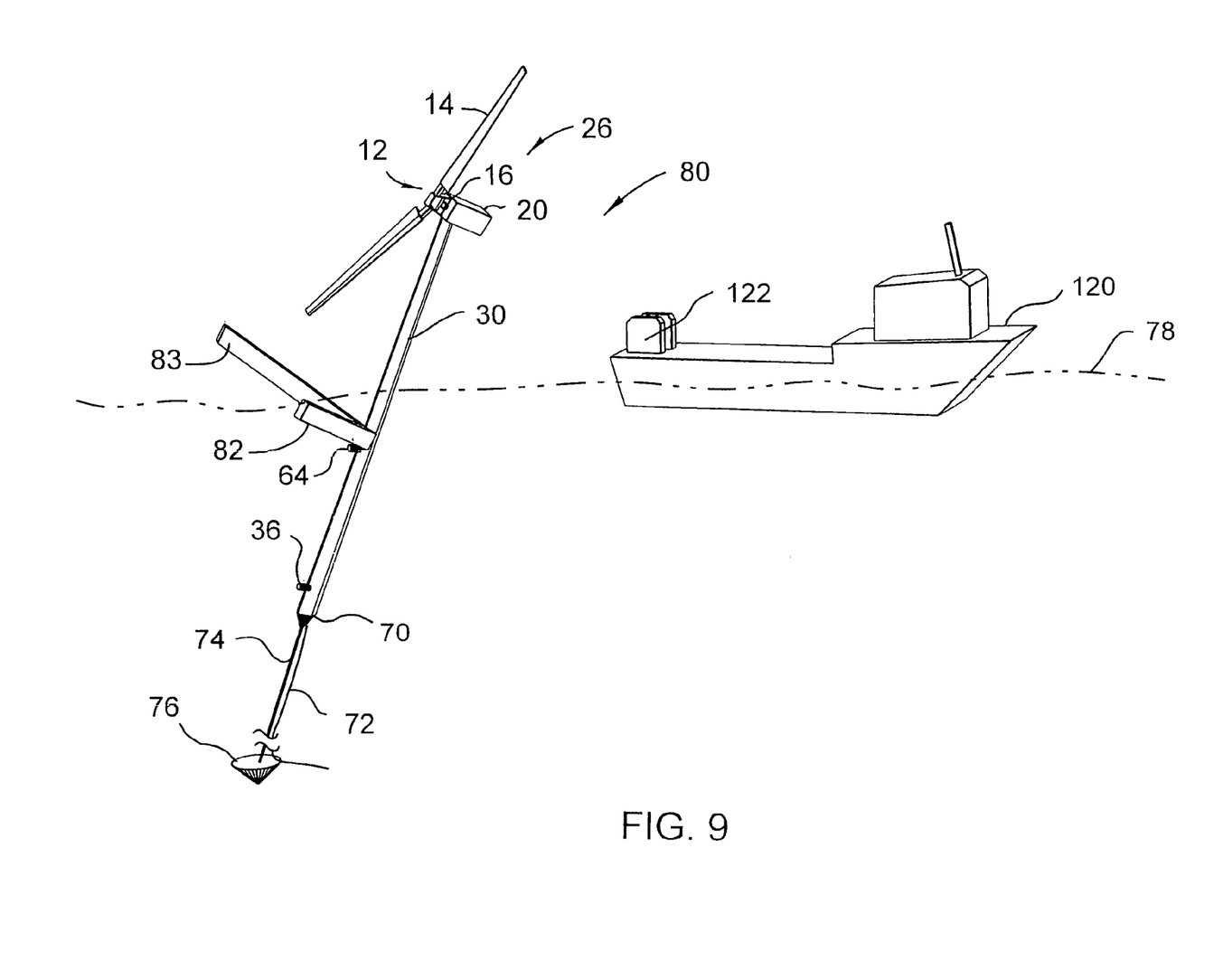
FIG. 9 is a perspective view of the embodiment of the floating wind turbine system shown in FIG. 4 utilizing buoyancy management during installation at an offshore site.

Referring to FIG. 9, the wind turbine system 80 is placed at the installation site by attaching the tether 74 from the tether attachment 70 to the anchor point 76 which has been pre-positioned upon the sea floor. Alternately, the anchor point 76 may be carried upon the ship or barge and attached to the wind turbine system 80 while the wind turbine system 80 is still carried by the cradle 122. The wind turbine system 80 and the anchor point 76 would then be installed at the same time. The wind turbine generator 26 is then released from the cradle 122 at the offshore installation site. The pumps are used to increase or decrease the contents of the buoyancy chambers 34 and 62 to allow the wind turbine system to tilt towards its functional operating position while the length of the tether 74 is adjusted for proper positioning upon the sea surface 78. The submersible electrical conductor 72 is subsequently attached. For maintenance, repair, or removal of the wind turbine system 80, the buoyancy is reduced by use of the pumps to cause the support tower 30 to tilt towards the sea surface 78 for accessibility to the components contained in the nacelle 20. While the method has been illustrated with the embodiment 80 of the invention having two stability arms 82 and 83, it will be appreciated that the method also may be used with the other embodiments 10, 90 and 110 that were described above.

It is apparent from the above description and the accompanying drawings that the design of the wind turbine system reduces the assembly and installation times as well as reducing the structural dynamic loads resulting in improved reliability. These design characteristics all translate to lower cost of energy produced than that of previous designs. The present invention includes the following features:

enables the offshore installation of fully or partially assembled wind turbines without assembling platforms and cranes at sea;

reduces the installation and repair times and costs;

is applicable to deep water installations in depths of over 25 meters;

has minimal anchor points to the sea floor;

reduces wind- or wave-driven structural dynamic loads; and eliminates the need for an active yaw drive system for aligning the wind turbine with the wind direction.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A floating wind turbine system comprising:
a buoyant support tower, said support tower having a submersible end and a longitudinal axis;
at least one buoyant stability arm extending from said support tower;
a position retention device attached to said support tower, said position retention device operable to retain said support tower within a desired area while also allowing said support tower to move in response to at least one of changing wind conditions and changing wave conditions; and
a wind turbine generator mounted upon said support tower, said wind turbine generator having a longitudinal axis that defines an acute angle with said support tower longitudinal axis.

2. The floating wind turbine system according to claim 1 wherein said stability arm has a longitudinal axis and further wherein said stability arm longitudinal axis defines an angle with said support tower longitudinal axis.

3. The floating wind turbine system according to claim 2 wherein said acute angle between said support tower longitudinal axis and said wind turbine generator longitudinal axis is a first acute angle and further wherein said angle defined by said support tower longitudinal axis and said stability arm longitudinal axis is a second acute angle that is within a range of 10 to 89 degrees.

4. The floating wind turbine system according to claim 3 wherein said second acute angle is less than said first acute angle.

5. The floating wind turbine system according to claim 3 wherein said position retention device includes a rotatable tether attachment mounted upon said submersible end of said support tower and a tether that extends from said tether attachment device to an anchor device, said tether attachment allowing rotation of said support tower relative to said tether while said tether and anchor device maintains the system in position.

6. The floating wind turbine system according to claim 5 wherein the system includes a submersible electrical conductor for transfer of electrical energy generated by the system to an electrical load.

7. The floating wind turbine system according to claim 4 wherein the system includes a plurality of stability arms extending from said support tower.

8. The floating wind turbine system according to claim 7 wherein the system includes two stability arms, said stability arms defining a stability arm angle therebetween that is within a range of 30 to 150 degrees.

9. The floating wind turbine system according to claim 8 wherein one of said stability arms has a first longitudinal axis that forms a first stability arm acute angle with said support tower longitudinal axis and further wherein said other of said stability arms has a second longitudinal axis that forms a second acute stability arm angle with said support tower longitudinal axis with said first stability arm acute angle being greater that said second stability arm acute angle to correct for torque effects upon said support tower generated by wind generator.

10. The floating wind turbine system according to claim 5 wherein said support tower includes at least one buoyancy chamber that is adapted to provide variable buoyancy for said support tower.

11. The floating wind turbine system according to claim 10 further including a pump and associated valves connected to said buoyancy chamber, said pump operative and co-operating with said valves to one of add water to, and subtract water from, said buoyancy chamber in said support tower to provide said variable buoyancy for said support tower.

12. The floating wind turbine system according to claim 11 wherein said at least one stability arm also includes at least one buoyancy chamber.

13. The floating wind turbine system according to claim 12 wherein said pump and associated valves are also connected to said buoyancy chamber in said stability arm, said pump also being operable and co-operating with said valves to one of add water to, and subtract water from, said buoyancy chamber in said stability arm to provide a variable amount of buoyancy for said stability arm.

14. The floating wind turbine system according to claim 11 wherein said wind turbine generator includes a rotor having at least one blade, a rotor hub and an electrical generator, said electrical generator being disposed within a nacelle that is mounted upon an end of said support tower that is opposite from said submersible support tower end.

15. The floating wind turbine system according to claim 14 wherein said wind turbine rotor includes a plurality of blades that define both an axis of rotation and a cone angle with a blade rotor plane that is perpendicular to said rotor axis of rotation and further wherein said blades are pivotably mounted upon said rotor hub with said blades pivoting less than 20 degrees from said cone angle to reduce coupled motions of said blade rotor plane and motions of the support tower induced by wind and wave forces.

16. The floating wind turbine system according to claim 5 wherein said tether attachment includes a slip ring for transferring electrical power from generator to said submersible electrical conductor when the wind turbine system rotates relative to said tether.

17. The floating wind turbine system according to claim 5 wherein said support tower has a upper portion that extends above the surface of the water and further wherein said support tower upper portion has a cross sectional shape of an airfoil.

18. The floating wind turbine system according to claim 5 wherein said support tower includes a guy post attached substantially perpendicular to the said support tower longitudinal axis with at least one of first guy cables connected between said guy post and each end of said support tower, second guy cables connected between said guy post and the outside of said stability arms, third guy cables connected from said stability arms to said ends of said tower and fourth guy cables extend between the inner surfaces of the stability arms.

19. The floating wind turbine system according to claim 2 wherein said stability arm extends perpendicularly from said support tower.

* * * * *